United States Patent
Grout et al.

[15] 3,704,006
[45] Nov. 28, 1972

[54] DISPERSION PRODUCING METHOD

[72] Inventors: Kenneth M. Grout, Topsfield; Richard D. Devellian, Rockport, both of Mass.

[73] Assignee: Kenics Corporation, Danvers, Mass.

[22] Filed: Jan. 25, 1971

[21] Appl. No.: 109,467

[52] U.S. Cl. .................................. 259/4, 259/DIG. 30
[51] Int. Cl. ............................. B01f 5/00, B01f 15/02
[58] Field of Search ..................... 259/4, 180, DIG. 30

[56] References Cited

UNITED STATES PATENTS 3,286,992  11/1966  Armeniades et al. ........... 259/4
2,125,245  7/1938   McCray ...................... 259/4 X

*Primary Examiner*—Walter A. Scheel
*Assistant Examiner*—Alan I. Cantor
*Attorney*—Russell & Nields

[57] ABSTRACT

A method for producing a dispersion of a dispersed phase in a continuous phase fluid in which the dispersed phase is immiscible. The method is performed in a system which includes a conduit containing a plurality of sheet-like elements extending longitudinally within the conduit. Each element is curved to turn the direction of fluid flowing past it. The elements are arranged in alternating right- and left-handed curvature groups (a group consisting of one or more elements). The two phases are injected into the conduit and pumped through it at predetermined velocity, which together with the density of the continuous phase, the interfacial tension between the phases and the inner diameter of the conduit determines the Weber number. The drop production reaches an equilibrium between break up and coalescence at about twelve elements and is well stabilized at 21 elements. The system and method can be used to extract solvents, remove color from or clarify liquids, remove or add heat, or affect mass transfer rates in reactions. It may completely oxidize a contaminant in an effluent, or for example, by dispersing an oxygen containing gas in water in which is disolved $Na_2SO_3$. Tests on various hydrocarbons dispersed in water are reported.

5 Claims, 9 Drawing Figures

DISPERSION PRODUCING METHOD

BACKGROUND OF THE INVENTION

1. Field of the Invention

Method for producing a dispersion of a dispersed phase immiscible in a continuous fluid phase.

2. Description of the Prior Art

The mixing or dispersion of one phase in another with which the first is immiscible is important in many chemical operations such as heat and mass transfer. Dispersion not only brings about a large increase in the interfacial area available for such transfer but also places the two phases in a state of motion which serves to increase the specific rates of the above transfer process. Dispersions may be classified by the rate at which the drops or particles of the dispersed phase coalesce and separate from the continuous phase. When such drops or particles reach colloidal size so that the dispersion becomes stable, non-settling and non-coalescing, the dispersion is termed an "emulsion." However, the term "dispersion" will be used herein its generic sense sense to include both stable and non-stable distributions of drops or particles in a continuous fluid phase. Likewise, the term "drops" will be used in the generic sense to include liquid drops, gas bubbles and solid particles.

Dispersions of one phase in another have been produced by injecting one phase in the other as a jet or sheet whereupon surface tension forces cause the latter to collapse into a dispersion of drops. Fluid dispersions thus produced have been further reduced in drop size by shear or turbulent forces by pumping the dispersion through a pipe at velocities which produce turbulent flow. Very high rates of fluid flow through orifices have produced dispersions by shear as the drops of the dispersed phase are propelled at high velocity through the continuous phase. Other mechanically driven agitators, stirrers and spinning disks have also been utilized.

Demands of present technology have made it highly desirable to increase efficiency and effectiveness in the production of dispersions above those which the prior art affords. In addition, one important defect of the prior art is that the distribution of drop sizes has been unduly wide. Ideally, particularly in chemical process, all drops should be of the same size and therefore each drop will have completed its chemical interaction with the continuous phase at the same time as each of the other drops. If there is a distribution of drop sizes about the ideal drop size, in general the larger drops will take too long to complete their interaction and the smaller drops will have completed their interaction too soon. Likewise, particularly where the interaction requires quite small drops which nevertheless are to be separated from the continuous phase when they have accomplished their purpose, the prior art has had a tendency to produce a substantial number of still smaller drops which make it very difficult to separate the dispersion by producing coalescence of such drops.

In producing emulsions, it has been necessary to continue the process of drop subdivision for longer than is desirable in order to insure that the drops at the upper end of the drop size distribution shall become small enough to come within the colloidal non-settling range.

SUMMARY OF THE INVENTION

The present invention substantially reduces the limitations of the prior art by producing the desired dispersion in a mixer of the type described and claimed in the U.S. patent to Armeniades et al. U.S. Pat. No. 3,286,992. In this invention the mixer takes the form of a conduit containing a plurality of sheet-like elements extending longitudinally within the conduit and each having a curvature to turn the direction of fluid flowing past the element, the elements being arranged in alternating right- and left-handed curvature groups (a group consisting of one or more elements) and with the leading and trailing edges of adjacent elements disposed at a substantial angle with respect to each other. The two phases are injected into the mixer and forced to flow through it at a predetermined velocity which determines a Weber number, which in turn produces a predetermined Sauter mean drop diameter of the dispersed phase. The invention may be used to extract solvents, remove color from or clarify liquids, remove or add heat, affect mass transfer rates, or produce emulsions. A preferred embodiment is used to completely oxidize $Na_2SO_3$ dissolved in effluent water.

DETAILED DESCRIPTION OF THE INVENTION

Figure 1:
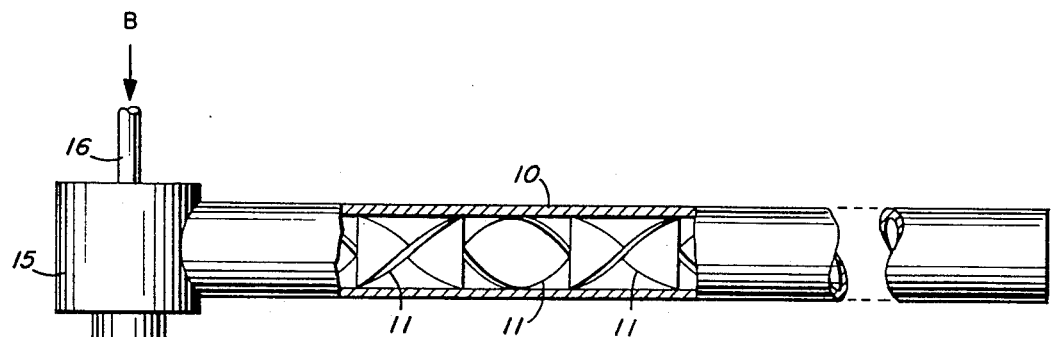
FIG. 1 is a diagrammatic representation of a system incorporating one form of this invention, with a portion of the mixer conduit broken away.

In FIG. 1, 10 is a hollow pipe, preferably cylindrical in cross-section, providing a conduit in which the dispersion of a material B of dispersed phase is to be produced in a fluid material A of continuous phase. Within the pipe 10 is disposed a plurality of serially arranged curved sheet-like elements 11. A portion of pipe 10 is broken away to show several of such elements 11. It is to be understood that any predetermined number of such elements may be present. Such number may be predetermined as will be explained below. Each of these elements is constructed of a flat sheet whose width may equal the inner diameter of pipe 10 and whose length is preferably up to several times its width. Each element is so twisted that its upstream and downstream edges are at a substantial angle to each other. This angle may vary between about 60° and 210°. Also each successive element is twisted in the opposite direction with respect to its preceeding element and the adjacent edges of successive elements are disposed at a substantial angle, preferably 90°, with respect to each other. Instead of reversing the twist of each successive element, a plurality of elements twisted in one sense may be followed by a plurality of elements twisted in the opposite sense. Therefore, the elements may be considered broadly as being arranged in alternating right-and left-handed curvature groups, it being understood that a group may consist of one or more elements.

Material A of the continuous phase may be introduced through a tube 12 and pumped by a pump 13 through a tube 14 into a header 15 to which the tube 10 is connected. Material B of the dispersed phase may be introduced into the header 15 through a tube 16 whereby it is injected into the continuous phase material A.

The velocity of the flow of the fluid mixture is determined by the flow of phase A which is regulated by the pump 13. The pump 13 may be electrically driven and may have its speed determined by a speed regulator 17 of any well-known type. The regulator 17 may be calibrated in the velocity of fluid flow through conduit 10 or may even be calibrated in the Sauter mean drop size for the particular dispersion involved which may be determined as explained below.

When a fluid is caused to flow through the above structure with a velocity sufficient to produce a substantial dispersion of material B in material A, the structure imparts a number of basic motions to the flowing material.

Figure 2:
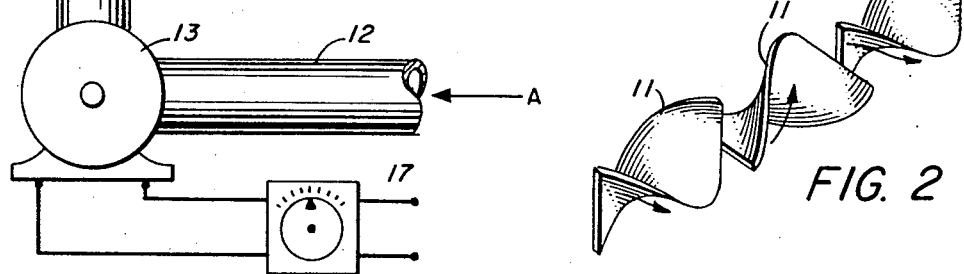
FIG. 2 is a perspective view of several of the elements used in the mixer of FIG. 1.
Figures 3A, 3B, 3C, 3D:
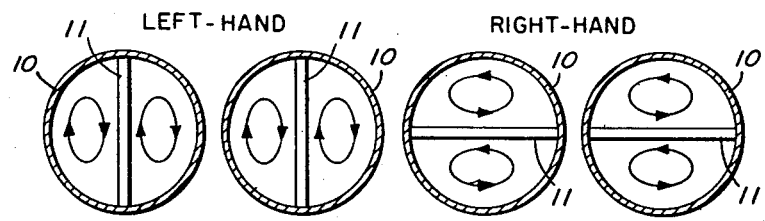
FIGS. 3a, 3b, 3c, and 3d are some cross-sections taken through the conduit of FIG. 1 at the leading and trailing edges respectively of two consecutive elements.

Firstly, the longitudinal flow of the liquid is reversed in the spiral path which it follows through successive elements 11 as shown in FIG. 2 in which the curved arrows designate the direction of flow. A second type of motion is illustrated in FIGS. 3a through 3d which represent successive cross-sections through the pipe 10. FIGS. 3a and 3b are taken respectively at the leading and trailing ends of an element 11 which is twisted in a left-hand direction. This causes the liquid flowing along said element to spin within a clockwise direction so indicated by the arrows in said FIGS. FIGS. 3c and 3d are taken respectively at the leading and trailing ends of the element 11 following that shown in FIGS. 3a and 3b. The element 11 in FIGS. 3c and 3d is twisted in a right-hand direction and caused the liquid flowing along it to spin in a counter-clockwise direction as indicated by the arrows in FIGS. 3c and 3d.

If we consider that the liquid emerges from the trailing end of each element 11 as two streams, we see that the leading edge of the following element 11 divides the liquid into double such number. While the identity of each of the four resulting streams is substantially destroyed by the spinning action defined above, nevertheless the number of such subdivisions increases exponentially according to the factor $2^n$, where $n$ is the number of sequential elements 11. Thus for 20 elements, over one million subdivisions are produced.

In addition, the point of maximum longitudinal velocity of flow constantly changes with respect to the central axis of the tube 10 as the fluid material moves through the structure.

The overall result of the above motions is that when the two immiscible fluids are caused to flow through the above structure, they are subjected to very high shear stresses, particularly in each region where the spin of the fluid changes from one direction to another, and drops of the discontinuous phase are produced within the continuous phase. As exemplified by the data reported below, it has been found that, in contrast with prior art devices, the efficiencies of the process of reducing average drop size, of narrowing the distribution of the sizes and generally or producing highly uniform and homogeneous dispersions are all substantially increased.

One series of tests conducted with the present invention involved the dispersion of the following liquids as the dispersed phase in water. These fluids and their physical properties are tabulated below, where $\rho$ represents density in grams per milliliter, $\mu'$ represents viscosity in centipoises, and $\sigma$ represents the interfacial tension between the two phases in dynes per centimeter:

|  | $\rho$(gms/ml) | $\mu'$ (cp) | $\sigma$ (dyne/cm) |
|---|---|---|---|
| Anisole | 0.99 | 1 | 26 |
| Benzene | 0.87 | 0.6 | 40 |
| Benzyl alcohol | 1 | 5 | 5 |
| Cyclohexane | 0.76 | 0.8 | 46 |
| Oleic Acid | 0.9 | 26 | 16 |
| Toluene | 0.87 | 0.6 | 32 |

The above properties are given at 25°C.

The above materials were selected because they represent a range of interfacial tensions which is typical of most industrially important two-phase systems. Also, variations in the density $\rho$ and in viscosity $\mu'$ for a wide variety of such industrially important systems will also lie substantially in the range involved with the materials tested.

The tests included measurements of the sizes of the drops of the dispersed phase in a given volume of continuous phase from which the Sauter mean diameter of such drops could be determined. The Sauter mean diameter, $\overline{D_{SM}}$, is computed as $$\overline{D_{SM}} = \frac{\Sigma 1^n n D^3}{\Sigma 1^n n D^2} \qquad \text{(Eq. 1)}$$

where $n$ is the number of drops observed and D is the respective diameter of each such drop. The Sauter mean diameter was determined because from it, and the volume fraction $\phi$ of the dispersed phase, the interfacial area per unit volume of continuous phase $a_v$ can be determined. The effectiveness of any mass transfer process is directly dependent upon $a_v$. The above quantities are related as follows.

$$a_v = 6\phi/\overline{D_{SM}} \qquad \text{(Eq. 2)}$$

Figure 4:
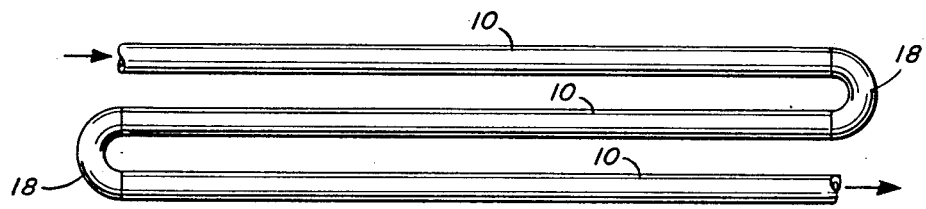
FIG. 4 is a diagram showing a plurality of mixers of the type in FIG. 1 connected in series.
Figure 5:
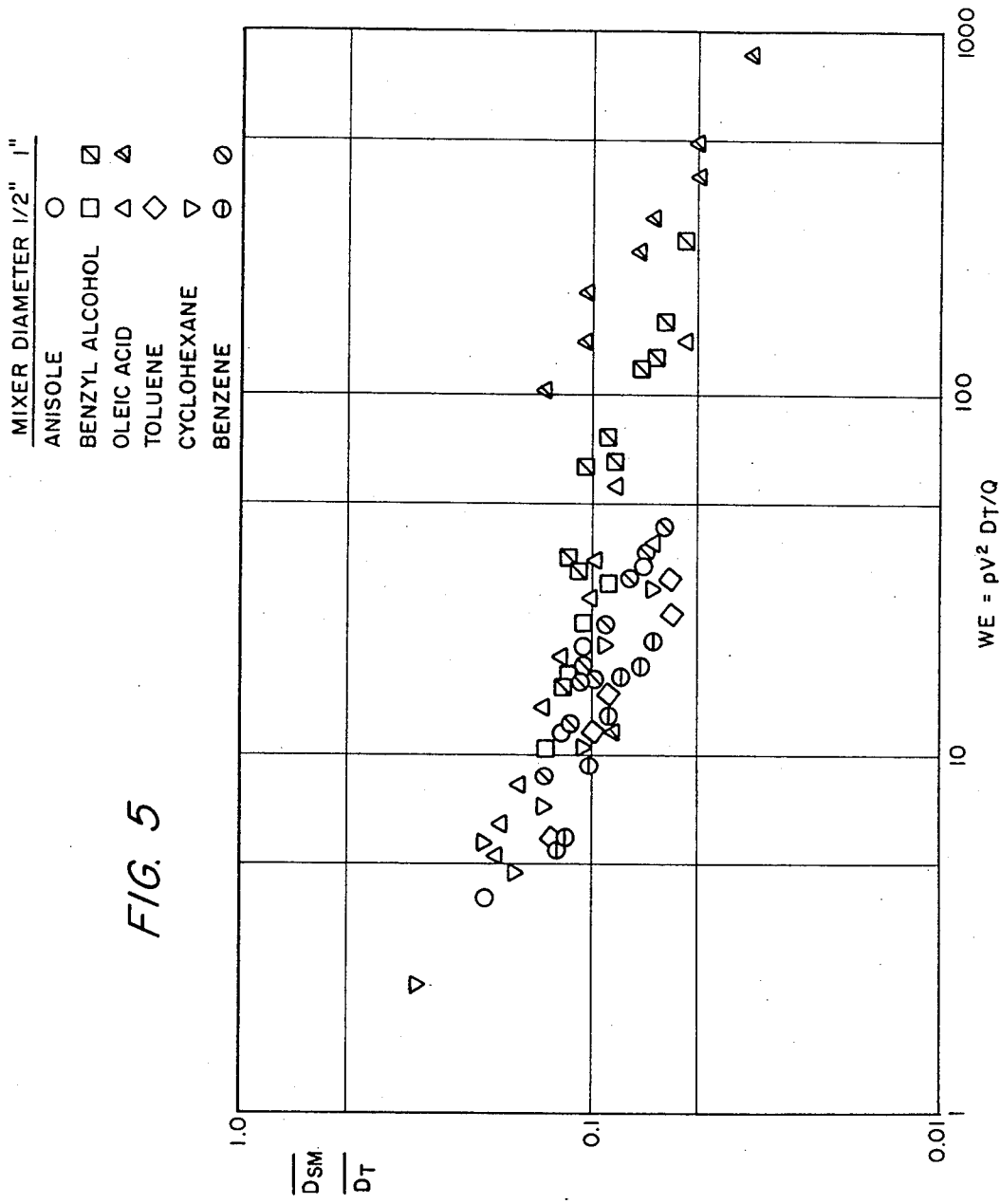
FIG. 5 is a plot of the Weber number against the ratio between the Sauter mean drop size and the inner diameter of the mixer conduit for a plurality of typical substances.

In FIG. 5 is plotted the data obtained from the above listed materials using mixers of the type shown in FIG. 1. In FIG. 4, the Weber number WE, computed as pointed out below is plotted against the value of $\overline{D_{SM}}/D_T$ where $D_T$ is the inner diameter of the tube 10. In each case 21 elements 11 were used, each element having a pitch of 1.5:1. In one set of tests the tube 10 had an inside diameter of one-half inch and in another set of tests, the tube 10 had an inside diameter of 1 inch.

The test demonstrated that the drop size or $\overline{D_{SM}}$ of the dispersed phase is primarily controlled by the magnitude of the Weber number WE which is defined as $$WE = \mu V^2 D_T/\sigma \quad \text{(Eq. 3)}$$

where $\rho$ is the density of the continuous phase, having an average longitudinal velocity V along a pipe or tube 10 having an inner diameter of $D_T$, and where $\sigma$ is the interfacial tension between the two phases.

One of the most effective prior art devices for producing dispersions in a continuous flow process is a turbulent flow section of an empty pipe of sufficient length to produce the desired average drop size. Therefore, similar test were performed with comparable materials in empty pipes of the same internal diameter as those of the mixers used as described above. The results showed that, in order to achieve the same interfacial area in the empty pipes, it is necessary to increase the Weber number by a factor of about 200. Since flow rate varies with the square root of the Weber number, this means that one needs to increase the flow rate in an empty pipe by a factor of about fifteen in order to obtain the interfacial area that would be created in a mixer according to the present invention.

As the two phases A and B are introduced into the mixer, the elements 11 break up the dispersed phase into drops which decrease in size as the flow progresses through the mixer. At the same time, some of the drops coalesce into larger drops. After a certain number of elements have been passed, equilibrium is established between break up and coalescense at which point the minimum drop size is attained. Tests have shown that the number of elements at which such equilibrium is established is substantially independent of velocity. The minimum number of elements at which such equilibrium is first attained is approximately twelve. Thereafter, as the flow continues through additional elements, such equilibrium is maintained. As the flow passes beyond the last element of the system, coalescense continues without a corresponding break up and the average drop size continues to grow until separation of the two phases is again complete. In view of the above, the number 21 was selected as the number of elements in the tests reported above in order to make sure that the minimum average drop size would be achieved in each case.

The total number of elements actually used in any system practicing this invention depends upon the degree to which the mass transfer process is to be carried out. Such process is time dependent and therefore a sufficient number of elements are selected so that at the particular flow velocity involved, the average drop size will remain at its minimum value for whatever predetermined time may be required for such mass transfer process to proceed at its maximum rate. In a typical case, the number of elements may be as many as about 1,200, although many applications will require a much lower number. Where many elements are to be used, a plurality of such conduits 10 may be connected in series as shown in FIG. 4 where U-shaped headers 18 are used to join such conduits in a compact folded arrangement. It is to be understood that even after the flow leaves the last element, the mass-transfer process will continue although at a decreasing rate as the average drop size increases.

Figure 6:
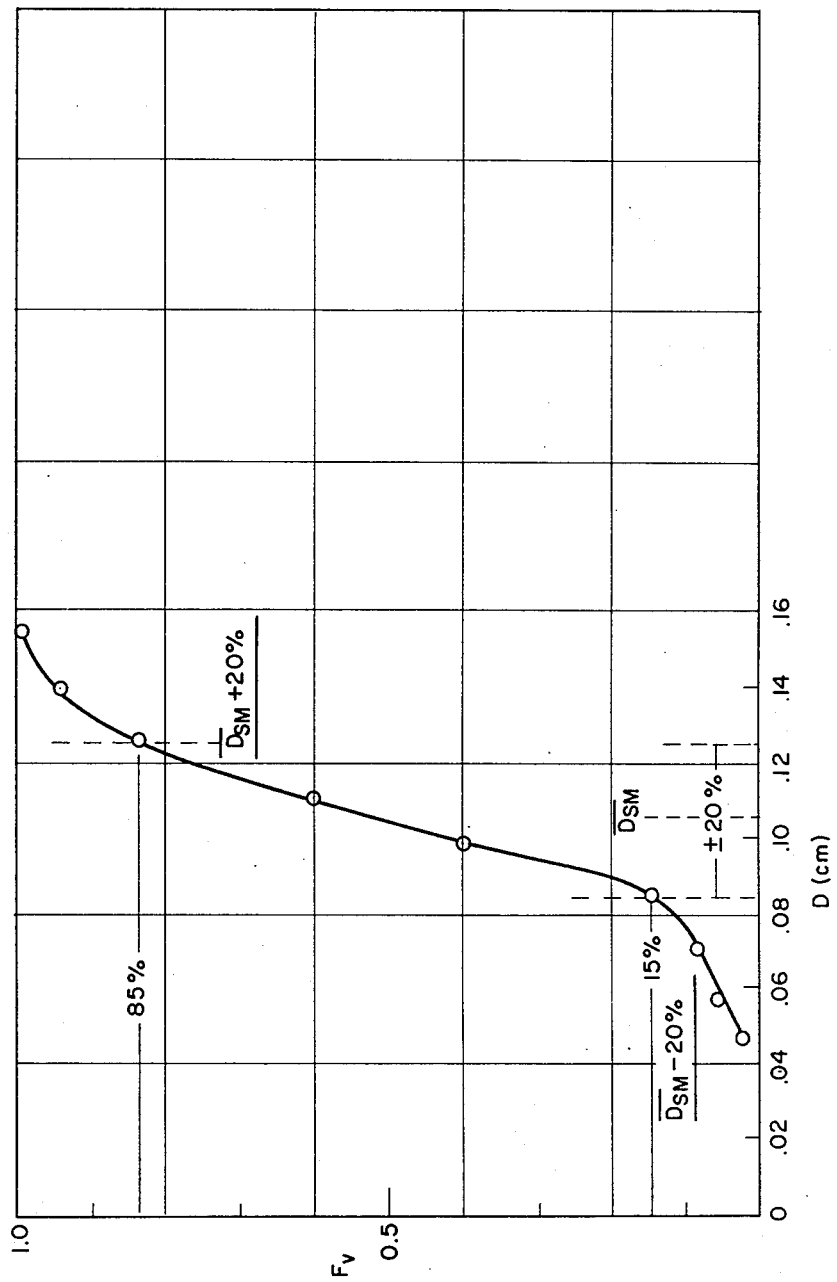
FIG. 6 is a plot of the distribution in a typical case of drop sizes against total volume fraction of such drops.

Another remarkable effect of drop size in dispersions produced in accordance with this invention is that the drop size distribution is substantially narrower than was previously attainable in related prior art systems. While the Sauter mean diameter is a characteristic measure of the drop sizes, it fails to give any indication of the range of sizes produced. Various measurements were made of the distribution of drop sizes in dispersions produced in accordance with this invention. FIG. 6 shows a typical distribution curve of data so determined, in which $F_v$, the total volume fraction associated with drops of a diameter less than some maximum drop size D is plotted against the values of the actual drop sizes measured. Thus, FIG. 6 represents a plot of the cumulative distribution function. In the typical case illustrated in FIG. 5, it will be seen that about 70 percent of the volume of the dispersion is associated with drops whose diameter lies within ± 20 percent of the average drop diameter. As compared with the prior art, this is a relatively narrow distribution which greatly increases the effectiveness and efficiency in the production of dispersions by the present invention.

Dispersions may be produced by this invention for such purposes as solvent extraction, color removal or clarification, removal or addition of heat and to increase mass transfer rates in chemical reactions. Among the more common mixtures to which this invention is applicable are water and hydrocarbons, and acidic or alkaline solutions to be combined in organic liquids. An important application of this invention is in the oxidation of oxidizable substances in effluents which have been contaminating rivers, lakes and other bodies of water. The discharge of such oxidizable substances causes a depletion of the oxygen content of such bodies of water, often with a catastrophic effect on the ecology involved. The effectiveness of this invention in increasing the rate at which such substances may be oxidized in structures according to this invention is such that complete oxidation can be produced in reasonably small systems and with highly practical flow rates and power consumption. For example, stack gases from a combustion device which contain $Na_2SO_3$ may have the $Na_2SO_3$ dissolved in water. Thereupon the solution is treated, in accordance with this invention, with a gas consisting of or containing free oxygen as the dispersed phase in the water as the continuous phase. Within a relatively compact and inexpensive structure, complete oxidation of the $Na_2SO_3$ occurs to produce $Na_2SO_4$ which makes no oxygen demand when the effluent is discharged and thus the effluent becomes substantially noncontaminating. Other important mass-transfer processes, which will occur to those skilled in the art, will be made possible by this invention.

What is claimed is:

1. The method of producing a dispersion of a first phase in a second fluid phase, said phases being immiscible, which comprises:
   a. injecting said phases into a conduit containing a plurality of curved sheet-like elements extending longitudinally within said conduit and each having a curvature to turn the direction of phases flowing through said conduit, said elements being arranged in alternating right- and left-handed curvature groups, the leading and trailing edges of adjacent elements in adjacent groups being disposed at a substantial angle with respect to each other;
   b. driving said phases through said conduit and past said elements at a predetermined velocity related to a Weber number which will produce drops of said first phase having a corresponding Sauter mean diameter.

2. A method as in claim 1 in which said phases are caused to traverse a minimum of about 12 of said elements arranged with alternate right-handed and left-handed curvatures.

3. A method as in claim 2 in which said number of elements is a minimum of 21.

4. A method as in claim 1 in which said second fluid phase is a liquid containing an oxidizable contaminent and said first phase is a gas containing free oxygen.

5. A method as in claim 1 in which said second fluid phase is water having $Na_2SO_3$ dissolved therein and said first phase is a gas containing free oxygen.

* * * * *